US012636683B2

(12) United States Patent
Bluestone et al.

(10) Patent No.: US 12,636,683 B2
(45) Date of Patent: May 26, 2026

(54) PARTS WASHER PUMP FOR USE WITH HEATED WATER BASED CLEANING FLUIDS

(71) Applicants: Ronald Bluestone, Lake Havasu City, AZ (US); Ryan Bluestone, Lake Havasu City, AZ (US)

(72) Inventors: Ronald Bluestone, Lake Havasu City, AZ (US); Ryan Bluestone, Lake Havasu City, AZ (US)

( * ) Notice: Subject to any disclaimer, the term of this patent is extended or adjusted under 35 U.S.C. 154(b) by 21 days.

(21) Appl. No.: 18/410,923

(22) Filed: Jan. 11, 2024

(65) Prior Publication Data

US 2024/0240640 A1 Jul. 18, 2024

Related U.S. Application Data

(60) Provisional application No. 63/438,716, filed on Jan. 12, 2023.

(51) Int. Cl.

| | |
|---|---|
| ***B08B 3/02*** | (2006.01) |
| ***B08B 3/08*** | (2006.01) |
| ***B08B 3/10*** | (2006.01) |
| ***F04D 13/08*** | (2006.01) |
| ***F04D 29/58*** | (2006.01) |
| ***F04D 29/70*** | (2006.01) |

(52) U.S. Cl.
CPC .................. *B08B 3/02* (2013.01); *B08B 3/08* (2013.01); *F04D 13/08* (2013.01); *F04D 29/5806* (2013.01); *F04D 29/708* (2013.01); *B08B 3/10* (2013.01)

(58) Field of Classification Search
CPC ............ F04D 13/08; B08B 3/02; B08B 3/006
See application file for complete search history.

(56) References Cited

U.S. PATENT DOCUMENTS

| | | | | |
|---|---|---|---|---|
| 3,343,555 A * | 9/1967 | Kasner | B08B 3/006 | 134/182 |
| 4,016,893 A * | 4/1977 | Scott | B08B 3/006 | 137/565.17 |
| 5,598,861 A * | 2/1997 | Danowski | B08B 3/006 | 134/182 |
| 6,179,558 B1 * | 1/2001 | Eastman, III | B01D 46/00 | 415/121.2 |
| 6,183,208 B1 * | 2/2001 | Qandil | H02K 5/124 | 417/201 |
| 6,199,565 B1 * | 3/2001 | Bluestone | B08B 3/006 | 134/201 |
| 2011/0217193 A1 * | 9/2011 | Wang | F04D 13/08 | 417/423.3 |
| 2018/0180056 A1 * | 6/2018 | Zolotukhin | F04D 29/043 | |

* cited by examiner

*Primary Examiner* — Kenneth J Hansen
(74) *Attorney, Agent, or Firm* — Paul B. Heynssens Attorney at Law, PLC

(57) ABSTRACT

A parts washer pump for use with heated water based cleaning fluids. A parts washer pump for use with heated water based cleaning fluids has a fan cooled electric motor coupled to a shaft at one end, and a submersible impeller pump coupled to the shaft at the other end. The pump may be submerged in a heated cleaning solution and the motor is kept at a distance and out of the cleaning solution.

17 Claims, 10 Drawing Sheets

Parts Cleaning System
200

Parts Cleaning System
200

PARTS WASHER PUMP FOR USE WITH HEATED WATER BASED CLEANING FLUIDS

TECHNICAL FIELD

This description relates generally to parts washing systems and more specifically to parts washing systems using heated aqueous solvents.

BACKGROUND

Parts washers are often used in machine shops, manufacturing, automotive transmission and engine repair shops. Also used in cleaning are soak tanks. Soak tanks are vessels containing a solvent such as a mixture of water and detergent, which take hours to "soften" the built-up road grime, fluids, tars and oils enough to be manually rinsed off prior to disassembly and repair. Heating the solution, and brushing can aid in loosening dirt and grime.

Gasoline, diesel fuel, and kerosene were commonly used to clean and degrease parts. Later, chlorinated solvents used in vapor degreasers were common. Environmental concerns led to the banning of chlorinated solvents for parts cleaning, which lead back to aqueous-based cleaning systems, but with improvements. A newer development is to utilize heated, aqueous based cleaning solutions. Hydraulic sprays may be used to improve the cleaning of parts by directing a pressurized solvent stream at a part from nozzles. Forcing a solution through a nozzle typically calls for the use of a pump in close proximity to the heated solution. However, contact with heated aqueous based solvents tends to cause such pumps to wear out somewhat quickly. Also it is difficult to cool a pump motor immersed in a heated solution.

Accordingly it would be desirable to have a pump for use in parts washing systems that is configured so that its parts are not exposed to the heated cleaning solution, is easy to cool, is cost effective, and tends to have a long life.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A parts washer pump for use with heated (or unheated) water based cleaning fluids and other types of cleaning solutions has an air fan cooled electric motor coupled to a shaft at one end, and a submersible impeller pump coupled to the shaft at the other end. The pump may be submerged in a heated cleaning solution and the motor is kept at a distance and out of the cleaning solution where air may be used to cool the motor and prolong its life.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a parts washer pump for use with heated water based cleaning fluids. Although the present examples are described and illustrated herein as being implemented in a parts washing system for heated water based cleaning fluids, the system described is provided as an example and not a limitation. As those skilled in the art will appreciate, the present examples are suitable for application in a variety of different types of cleaning systems, including heated and unheated, aqueous, petroleum based and the like.

A parts washer is a piece of equipment used to remove contaminants or debris, such as dirt, grime, carbon, oil, grease, metal chips, cutting fluids, mold release agents, ink, paint, corrosion from work pieces and the like. Parts washers are used in some of the last steps in the parts manufacturing process. Parts washers are designed to clean, degrease and dry small or large parts in preparation for the next manufacturing step, such as surface treatment, or packaging and shipping. Parts washers may also be used in reconditioning used parts and in repair shops. Parts washers are essential in maintenance, repair and remanufacturing operations as well, from cleaning fasteners, nuts, bolts and screws to engine parts and automotive assemblies.

Newly machined, molded and fabricated products are typically contaminated with oils, chemicals, burrs, abrasive dust, paint and other residue left over from the fabrication process of metal, plastic and rubber components. Applied coatings are not effective if they are applied on a dirty surface.

Most parts washers use a pump to create a spray of solvent or cleaner. The invention described herein uniquely provides an air cooled motor with a submersible pump coupled by a shaft long enough to keep the motor out of the parts cleaner.

In addition the parts washing system described below may advantageously be used in small scale operations where fractional horsepower units capable of being used in conjunction with a barrel or drum tend to be absent in the market.

Figure 1:
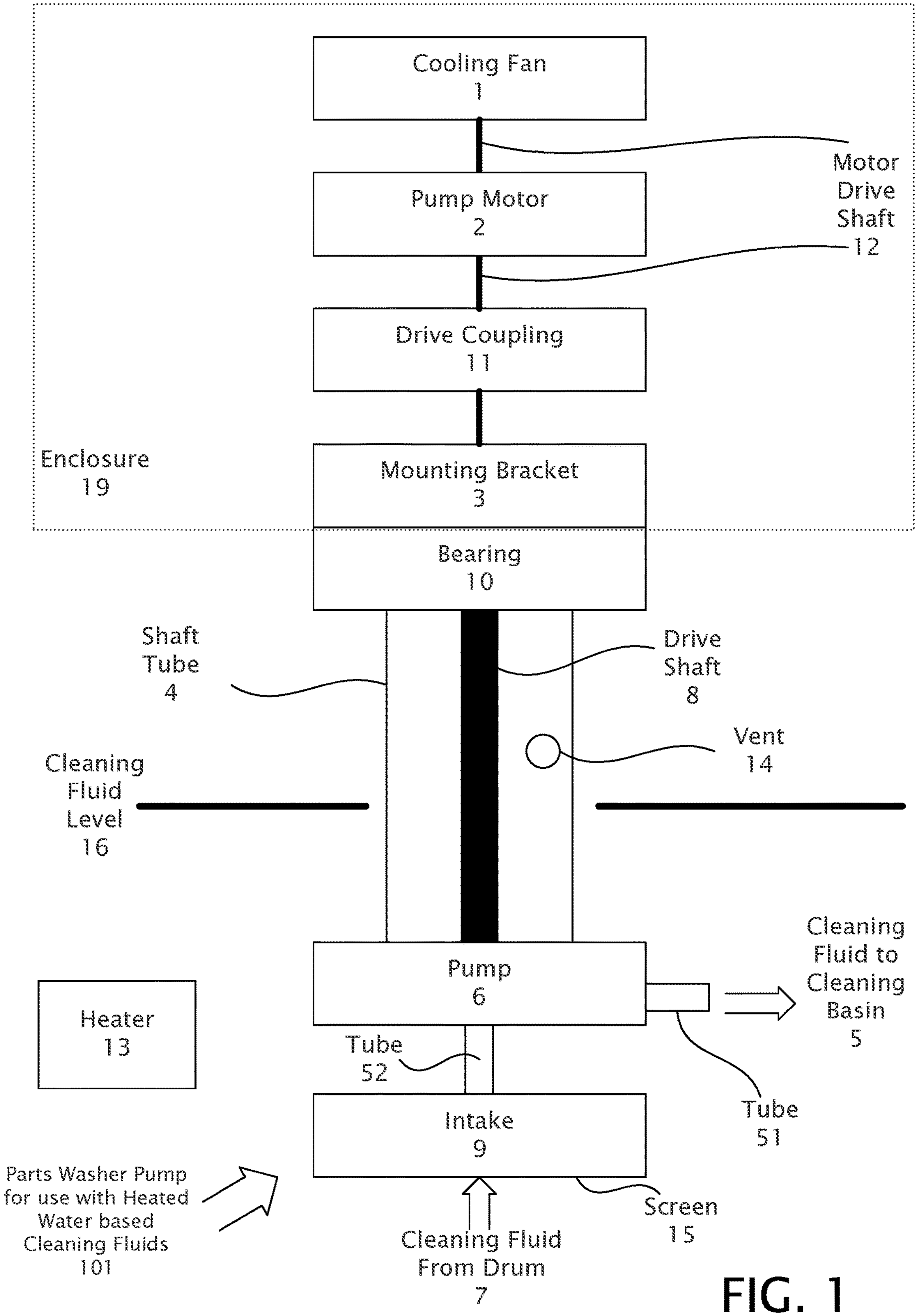
FIG. 1 shows a block diagram of a parts washer pump for use with heated water based cleaning fluids.

FIG. 1 shows a block diagram of a parts washer pump for use with heated water based cleaning fluids 101. In a typical submersible pump (not shown) all of the pump components are typically submerged in the liquid being pumped. However, such an arrangement exposes all of the pump components to the solution being pumped, which in the case of cleaning fluids and solvents tends to prematurely age the pump. To reduce pump wear and promote cooling in the parts washer pump for use with heated water based cleaning fluids 101 the motor 2 is mounted at a distance from the pump 6, with the pump 6 in the solution, and the motor 2 out of the solution above the cleaning fluid level 16 where it can be air cooled. This allows for optimal operation of the impeller pump 6 and improved cooling of the motor 2 as an additional cooling fan 1 may be included to cool the motor 2.

Pump motor 2 may include a shaft axially protruding through the motor. A first end of the motor shaft is coupled to a cooling fan 1. A second end of the motor shaft may be coupled through a drive coupling 1 land passing through a mounting plate 3 to couple to a drive shaft 8. At a first drive shaft 8 end adjacent to the drive coupling 11 the drive shaft 8 may be supported by a bearing 10. The drive shaft 8 is surrounded by a vented 14 shaft tube 4. At a second drive shaft end the drive shaft 8 is coupled to a pump 6, submersed below the cleaning fluid level 16. The pump 6 is coupled to an intake 9 with a screen 15 via a tube 52. Fluid from the drum 7 enters the intake 9 and is expelled from the pump 6 through tube 51 to a convenient location such as a cleaning basin 5. The vented shaft tube 4 protects the shaft 8 and provides mechanical support as an upper end of the shaft tube 4 is attached to a housing containing the bearing on the mounting plate or bracket. The lower end of the shaft tube is attached to the pump 6. A conventionally constructed immersion heater may be provided to heat the cleaning solution. It may be included in the parts washer pump for use with heated water based cleaning fluids assembly, or as a separate unit.

Figure 2:
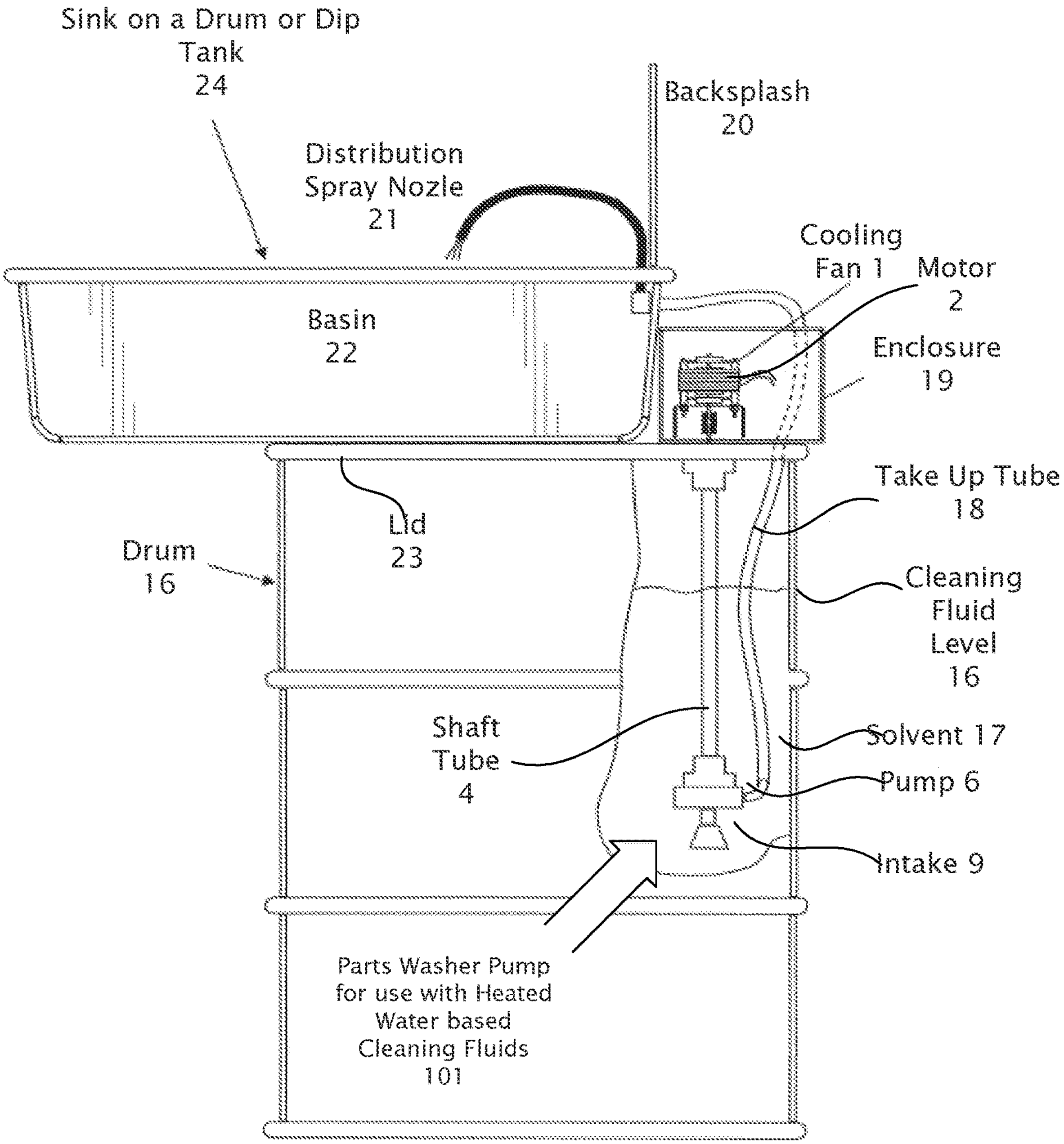
FIG. 2 is a parts washing system using a parts washer pump for use with heated water based cleaning fluids.

FIG. 2 shows a parts cleaning system 200 utilizing a parts washer pump for use with heated water based cleaning fluids 101. The system described may also be advantageously used with unheated solvents of various types that are available. As can be seen the submersed pump 6 is mounted away from the motor 2 that sits on top of the drum 16 lid 23. A suitable motor for this application is typically a fractional horsepower unit. With the pump 6 submersed in the cleaning solution 17, and the motor 2 above the fluid on top of a drum 16 or container a fan can be used to cool the motor 2. To protect the fan and motor the parts washer pump for use with heated water based cleaning fluids may be mounted in an enclosure 19 that may be attached, or resting on the lid 23 of a drum 16 containing the solvent 17. Alternatively the pump 101 may be attached to a basin 22 in which parts are washed with a distribution spray nozzle 21, which may incorporate a brush. To further protect the pump 101 a backsplash 20 may be installed between the basin 22 and the pump 101.

In operation solvent 17 enters the intake 9 where the pump 6 ejects it to a take up tube 18 and ultimately to a spray nozzle 21 discharging in a basin 22. In alternative examples the spray nozzle may include a cleaning brush, to aid in scrubbing parts. The motor 2 is further protected by an enclosure 19 that may be of any suitable material to shield the motor, preferably with air vents to aid operation of the fan 1.

The drum 16 may be any suitable basin or container suitable for holding the unused solvent 17. Likewise the basin 22 may be any suitable vessel for collecting spray from the conventionally constructed nozzle 21 when cleaning or washing parts. The backsplash 20 may be of plastic, wood or the like and may be integral to the basin 22 or an attached separate piece. Likewise the pump 101 may be separate from the basin 22 or it may be attached via either the housing or the mounting plate. In this particular application fractional horsepower motors tend to produce sufficient pressure at the nozzle.

In alternative examples a plurality of pumps 101 may be provided to increase pressure or to drive a plurality of spray nozzles.

The shaft tube 4 may be of adjustable length, or may be made of a length sufficient to reach near the bottom of the drum 16. Typically a screen or filter (not shown) is provided on the intake 9 to keep dirt and debris from the recirculating used solvent from entering the pump.

FIGS. 3-10 show various views of a parts washer pump for use with heated water based cleaning fluids. The following description relates to FIGS. 3-10.

Figure 3:
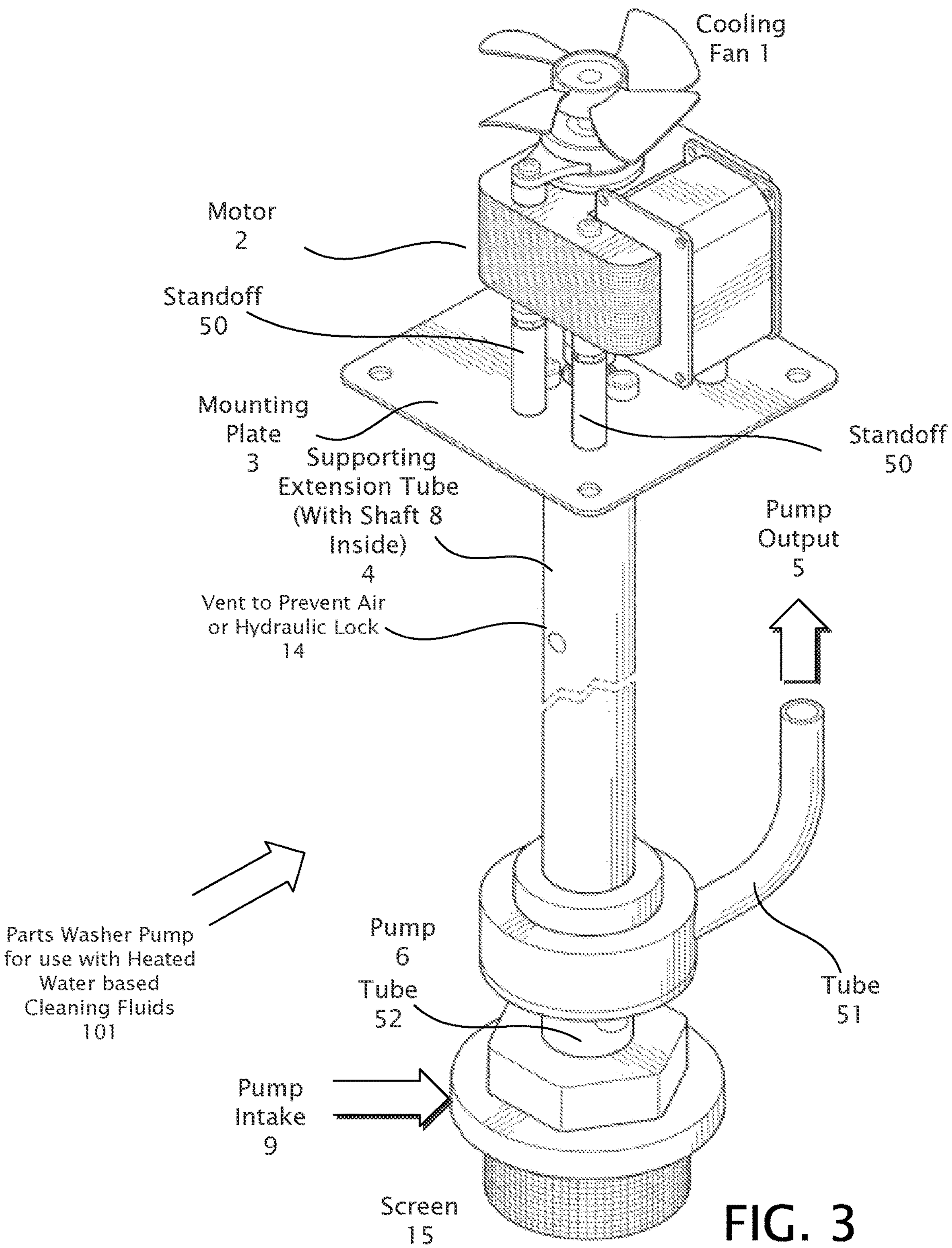
FIG. 3 is a downward looking inclined view of a parts washer pump for use with heated water based cleaning fluids.

FIG. 3 is a downward looking inclined view of a parts washer pump for use with heated water based cleaning fluids.

Figure 4:
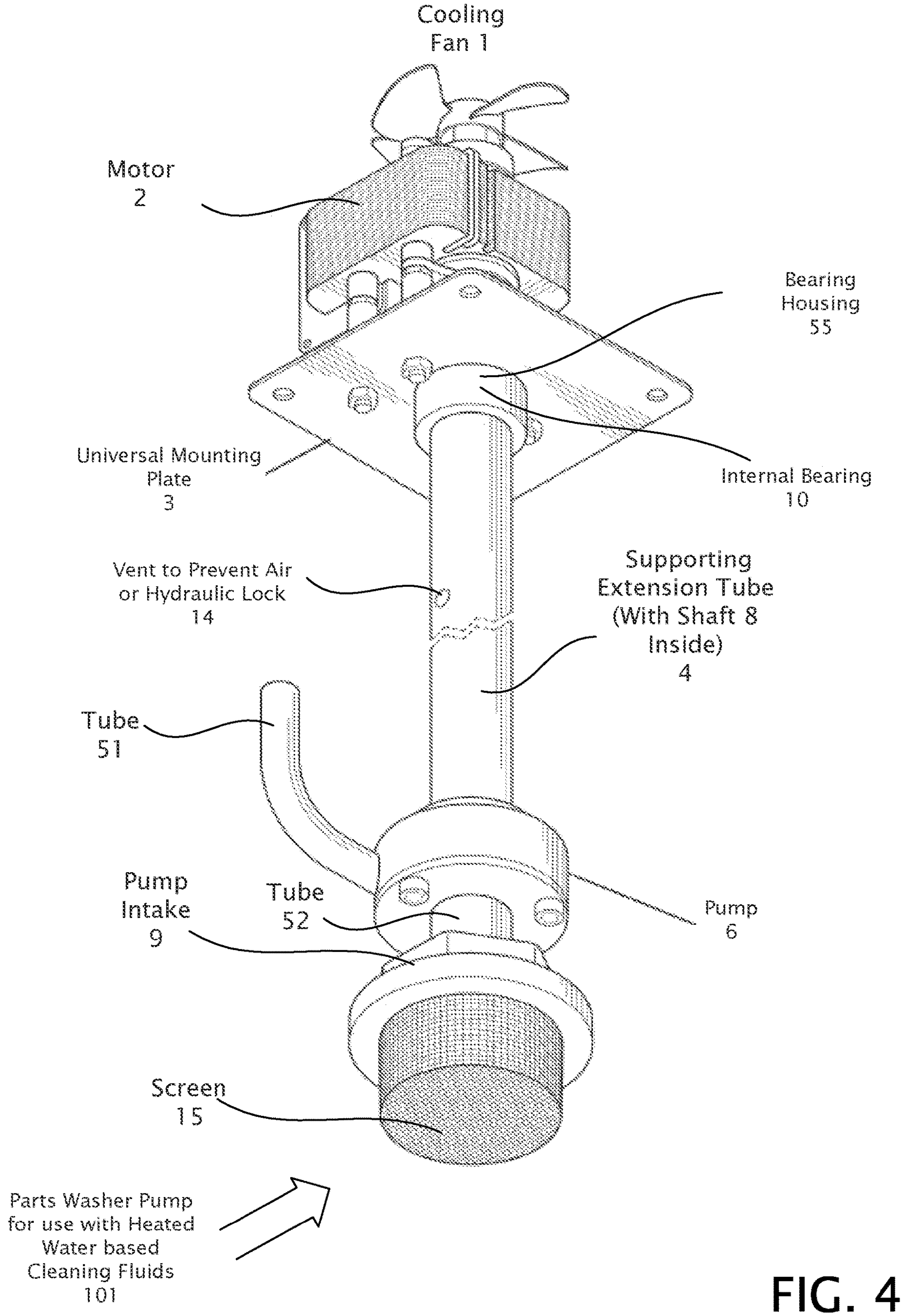
FIG. 4 is a upward looking inclined view of a parts washer pump for use with heated water based cleaning fluids.

FIG. 4 is a upward looking inclined view of a parts washer pump for use with heated water based cleaning fluids.

Figure 5:
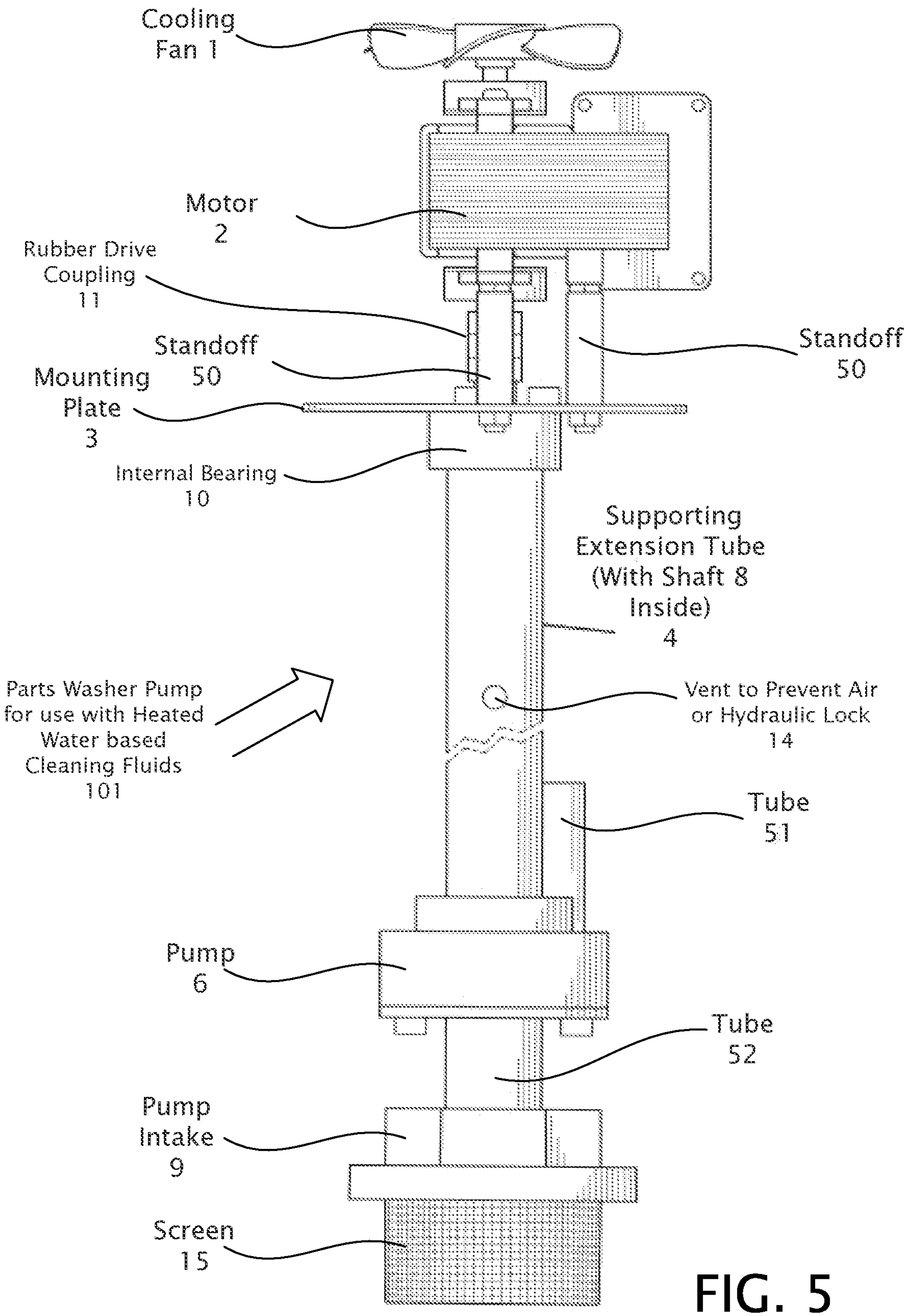
FIG. 5 is a front view of a parts washer pump for use with heated water based cleaning fluids.

FIG. 5 is a front view of a parts washer pump for use with heated water based cleaning fluids.

Figure 6:
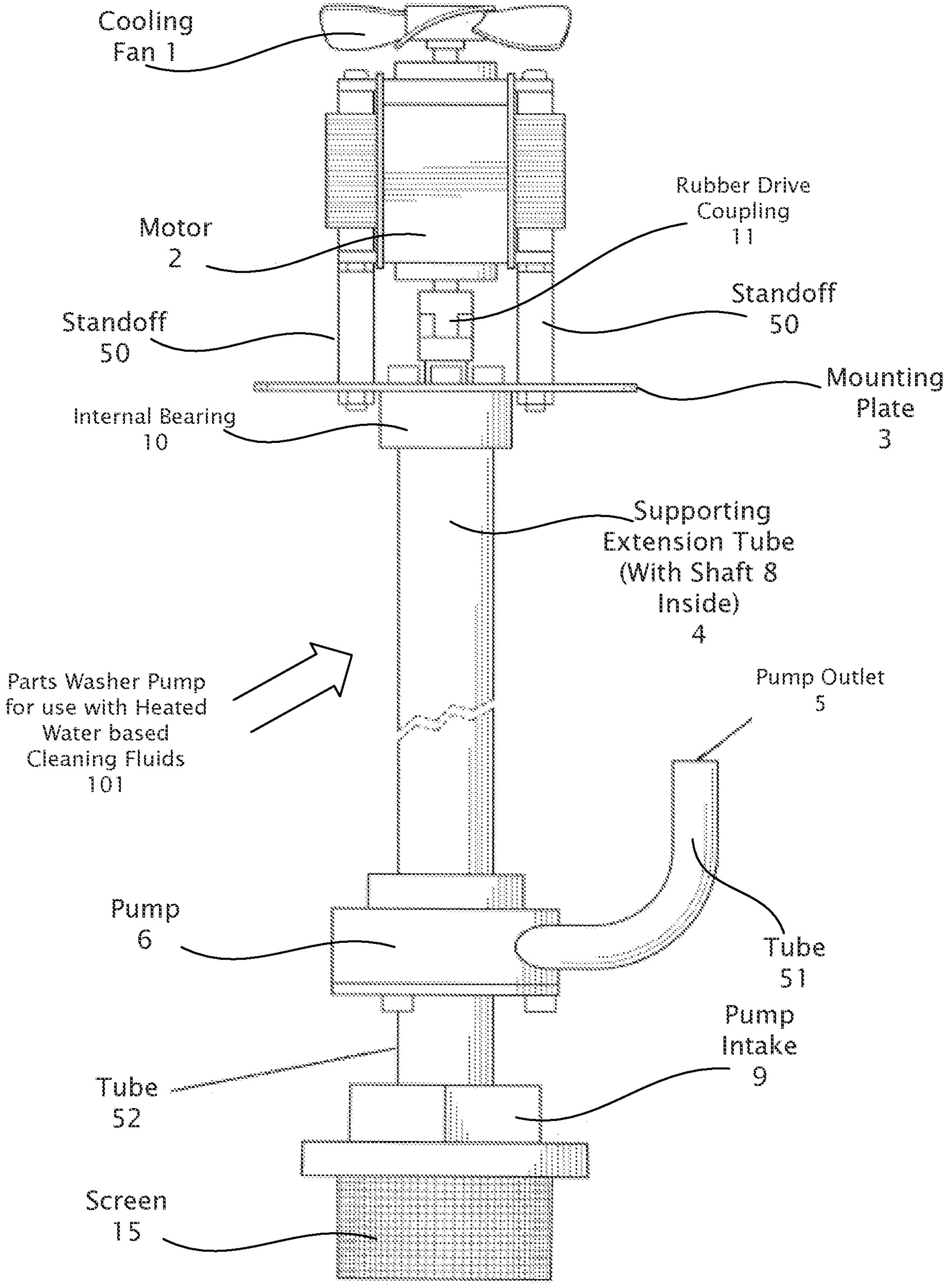
FIG. 6 is a right side view a parts washer pump for use with heated water based cleaning fluids.

FIG. 6 is a right side view a parts washer pump for use with heated water based cleaning fluids.

Figure 7:
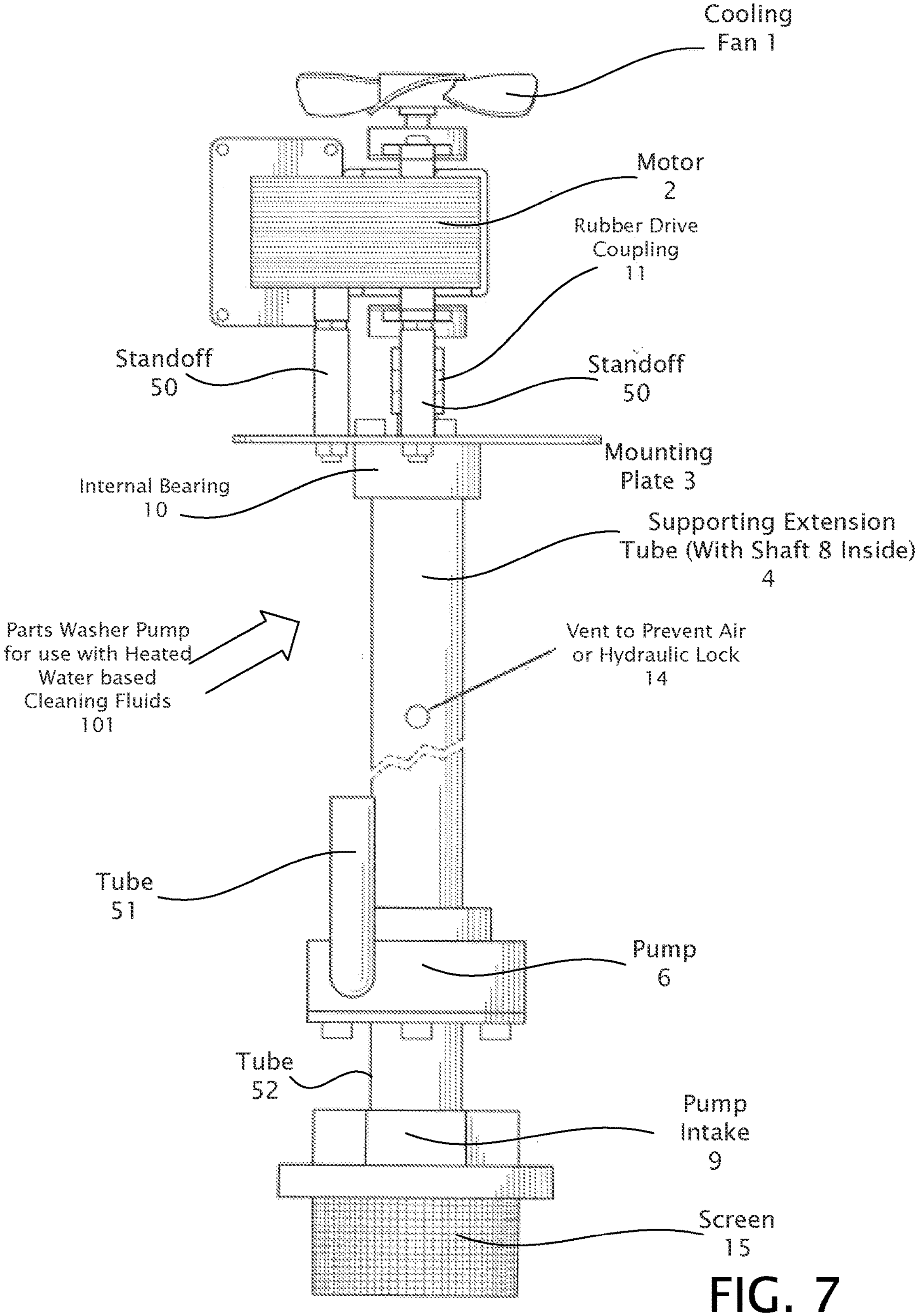
FIG. 7 rear view of a parts washer pump for use with heated water based cleaning fluids.

FIG. 7 rear view of a parts washer pump for use with heated water based cleaning fluids.

Figure 8:
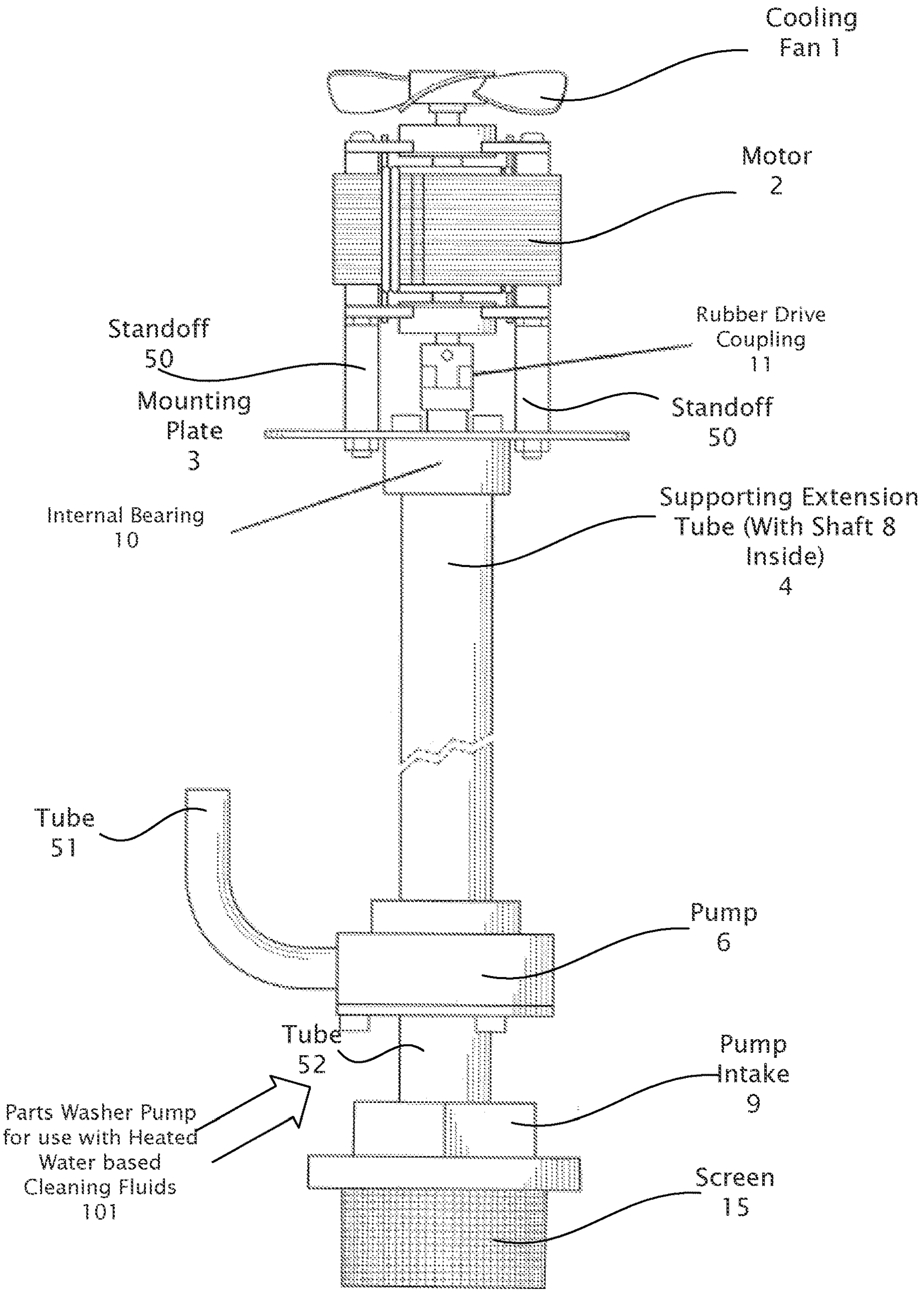
FIG. 8 left side view of a parts washer pump for use with heated water based cleaning fluids.

FIG. 8 left side view of a parts washer pump for use with heated water based cleaning fluids.

Figure 9:
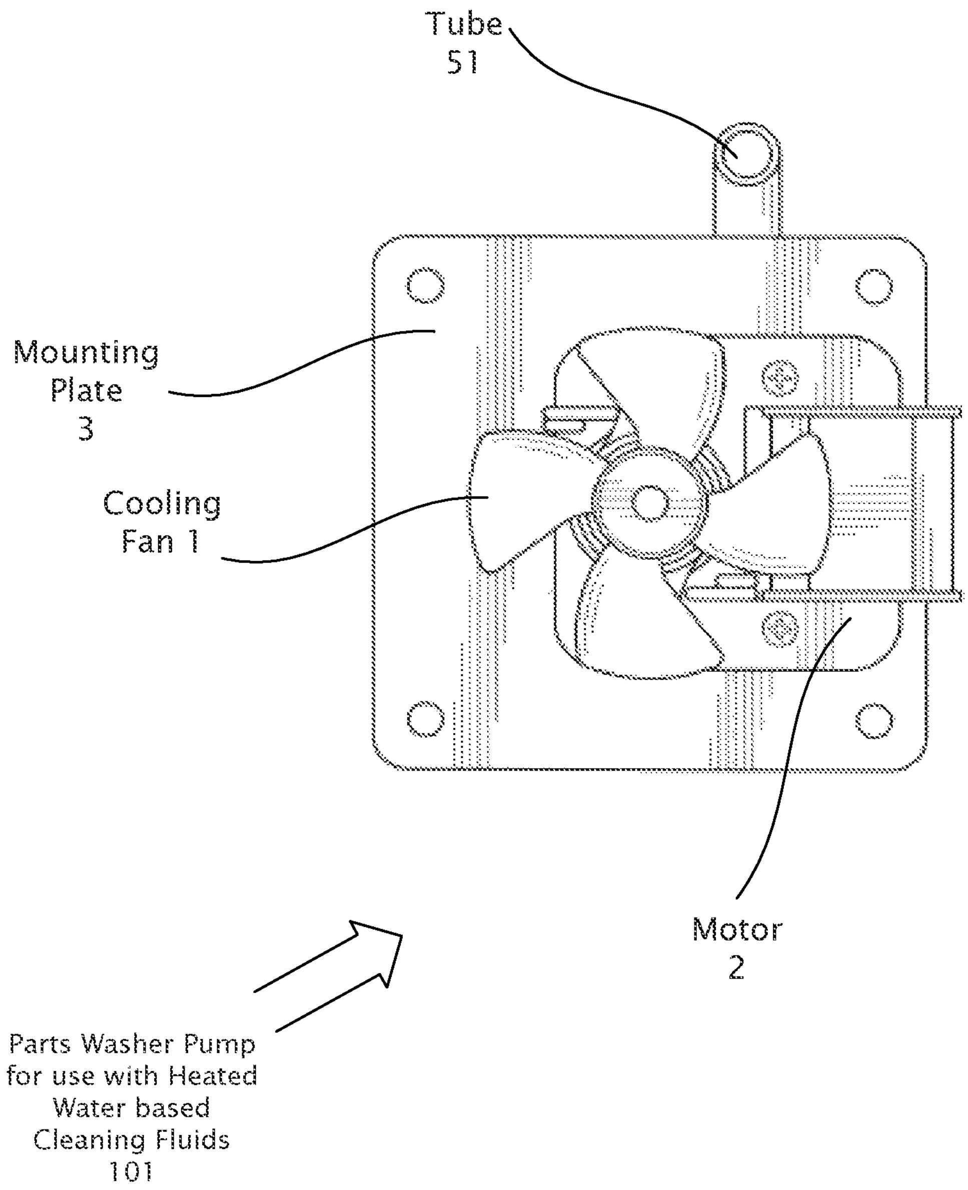
FIG. 9 is a top view of a parts washer pump for use with heated water based cleaning fluids.

FIG. 9 is a top view of a parts washer pump for use with heated water based cleaning fluids.

Figure 10:
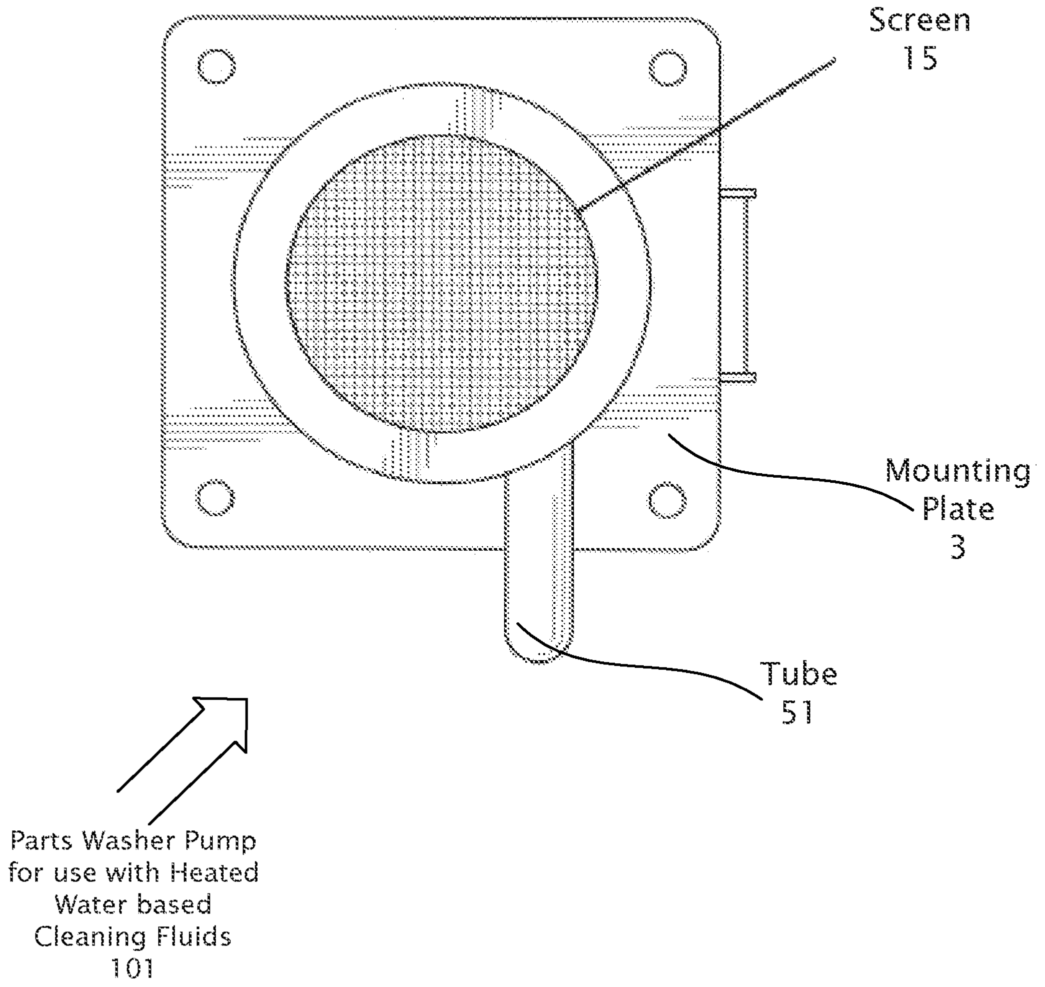
FIG. 10 is a bottom view of a parts washer pump for use with heated water based cleaning fluids.

FIG. 10 is a bottom view of a parts washer pump for use with heated water based cleaning fluids.

The motor 2 may be mounted to a universal mounting plate 3 via standoffs 50. The mounting plate may include a cover (19 of FIG. 2) and mounting hardware that allows the pump 101 to be either removably or permanently be mounted to an object such as a drum 16 or a catch basin 22. The motor may be AC or DC and may include thermal overload protection circuitry. In the applications described herein, the motor is typically a fractional horsepower power rating. The motor may be activated by a switch, a foot pedal, or the like. The motor typically provides an axial drive shaft that protrudes from opposite sides of the motor.

A conventionally bladed fan 1 may be coupled to a first end of a motor shaft to promote air cooling of the motor. Air is directed onto the motor 2 and in the example shown the fan 1 turns at the same speed as the motor 2. In alternative examples the fan may include a speed adjustment mechanism, and/or thermostatic control.

A conventionally constructed rubber drive coupling 11 may be disposed between a second end of the motor shaft, and a long drive shaft 8 that extends vertically through the solvent and into the pump 6. The drive coupling 11 couples the motor 2 to the drive shaft 8 and also tends to isolate vibrations that may be present.

The drive shaft 8 couples the motor 2 to the pump 6. A bearing housing 55, with an internal bearing 10 is disposed on the bottom (or alternatively on the top or center) of the mounting plate 3. The bearing engages and supports the motor end of the shaft 8. The pump end of the shaft 8, drives a pump 6, which may be a conventional impeller pump or the like.

A supporting extension tube or equivalently a mounting tube 4 surrounds the shaft 8, and is attached at a first end to the bearing housing, and at the second end to the pump 6. The tube 4 includes a vent aperture to prevent air or hydraulic lock of the pump. The mounting tube may be made of metal, plastic, or any suitable material. The mounting tube serves to maintain the pump and motor in a fixed relationship with each other, and protect the turning shaft that drives the impeller pump.

The pump 6 is a typical impeller pump that may be mounted in a metal, plastic, or equivalent pump housing. The impeller is axially driven by the shaft 8. A pump outlet 51 positioned at the side of the pump, and may be coupled to a hose or the like that supplies the solution to a desired location. A pump inlet tube 52 extends from the bottom of the pump 6.

A pump intake 9 is conventionally constructed to hold a screen 15 (and in alternative examples a filter media), and may be coupled to the pump 6 via a tube 52 aligned axially with the shaft 8, and at the bottom side of the pump.

In summary, a shaft couples the pump to the motor inside a mounting tube that is fixedly attached to the pump and the mounting plate. The mounting tube may include one or more vent holes. The mounting tube may also include one or more internal bearings in which the shaft turns. The shaft may also be coupled to the motor through a rubber (or equivalent) drive coupling.

Those skilled in the art will realize that the process sequences described above may be equivalently performed in any order to achieve a desired result. Also, sub-processes may typically be omitted as desired without taking away from the overall functionality of the processes described above.

The invention claimed is:

1. A parts washer pump comprising:

a fan cooled electric motor attached to a flat mounting plate by a plurality of cylindrical spacers extending from a top fan surface to the flat mounting plate and having a motor shaft;

a rubber drive coupling coupled to the motor shaft at a first coupling end and a driveshaft at a second coupling end;

a bearing housing attached to a bottom surface of the flat mounting plate including a single internal bearing disposed in the bearing housing and through which the driveshaft extends, the driveshaft contacting and being supported by the bearing;

a support tube enclosing the driveshaft and attached to the bearing housing at a first top end;

a submersible impeller pump housing having a top side attached to a second bottom end of the support tube and with a second end of the driveshaft, extending, unsupported, into, the submersible impeller pump housing, and including an impeller, disposed in the submersible impeller pump housing, that is driven by the second end of the-driveshaft, and the submersible impeller pump housing having a bottom side aperture;

a pump intake having an aperture on a top pump intake side, having a tube attached to the aperture on the top pump intake side at a first tube end and a second tube end attached to the bottom side aperture, the pump intake further having a bottom side covered by a cup shaped screen, having a screen opening size sufficient to filter particles from entering the submersible impeller pump housing; and whereby the support tube includes the single internal bearing alone, leaving the second end of the driveshaft with the impeller unsupported.

2. The parts washer pump of claim 1, in which the fan cooled electric motor is one horsepower or less.

3. The apparatus of claim 1, in which the support tube is cylindrical.

4. The parts washer pump of claim 1, in which the driveshaft is of a length from 24-30 inches.

5. The parts washer pump of claim 1, in which the driveshaft is of an adjustable length.

6. The parts washer pump of claim 1, in which the support tube is vented.

7. The parts washer pump of claim 1, in which an output of the impeller pump housing is a rigid tube exiting a side of the impeller pump housing.

8. The parts washer pump of claim 1, in which the support tube is in coaxial alignment with the driveshaft.

9. A parts washer pump comprising:

an electric motor with a motor shaft having a first motor shaft end protruding from a top motor surface and a second motor shaft end protruding from a bottom motor surface;

a bladed fan attached to the first motor shaft end, and positioned to blow air directly on the electric motor disposed directly in an airflow path created by the bladed fan;

a rubber drive coupling having a first coupling end coupled to the second motor shaft end, and having a second coupling end;

a driveshaft having a first driveshaft end and a second driveshaft end, with the first driveshaft end coupled to the second coupling end of the rubber drive coupling;

a mounting plate attached to, and supporting, the electric motor by a plurality of cylindrical spacers extending from a bottom fan surface to the flat mounting plate and including a bearing housing disposed on a mounting plate bottom surface with a bearing disposed therein and through which the driveshaft extends;

a support tube enclosing the driveshaft and attached to the bearing housing at a first support tube end;

a submersible impeller pump housing attached to a second support tube end, and including an impeller attached to the second driveshaft end, and having a side discharge tube, and a bottom intake;

a pump intake having a cylindrical sided flat bottom cup shaped screen on a bottom intake surface, and an outlet on a top pump intake surface, oriented in parallel relation to the bottom intake surface; and a tube having a first tube end attached to the bottom intake and a second tube end attached to the outlet on a top pump intake surface of the submersible impeller pump housing.

10. The parts washer pump of claim 9 in which the bladed fan is a single piece having at least two fan blades, and a hole at a center of balance to couple to the first motor shaft end of the motor shaft.

11. The parts was her pump of claim 10 in which the bladed fan is plastic and the at least two fan blades are oriented to direct cooling air directly on the motor.

12. The parts washer pump of claim 10 in which the support tube is aligned axially with the driveshaft.

13. A parts washer comprising:

a basin having a backsplash attached to a basin back wall, the basin configured to rest on top of a container of water based solvent;

a parts washing pump positioned behind the backsplash, the parts washing pump including:

an unenclosed electric motor with a motor shaft, the motor shaft having a first motor shaft end protruding from a top motor surface and a second motor shaft end protruding from a bottom motor surface;

a bladed fan attached to the first motor shaft end the bladed fan positioned to blow air directly on the unenclosed electric motor;

a coupling having a first coupling end coupled to the second motor shaft end, and a second coupling end;

a driveshaft having a first driveshaft end and a second driveshaft end, with the first driveshaft end coupled to the second coupling end of the coupling;

a mounting plate including a bearing housing with a bearing disposed therein and through which the driveshaft extends, and to which the electric motor is attached, by a plurality of standoffs;

a support tube enclosing the driveshaft, and attached to the bearing housing at a first support tube end, and a second support tube end, with the support tube extending into the container of water based solvent, and having a vent hole positioned above a water based solvent level;

a submersible impeller pump housing attached to the second support tube end, and including an impeller attached to the second driveshaft end, the impeller driven by the drives haft and further including a rigid side discharge tube, and a bottom intake aperture;

a pump intake having an intake aperture, covered by a cup shaped screen, on a bottom pump intake surface, and an outlet aperture on a top pump intake surface; and a tube having a first end attached to the bottom intake aperture of the submersible impeller pump housing, and a second end attached to the outlet aperture of the pump intake;

a flexible take up tube coupled at a first end to the rigid side discharge tube;

a spray nozzle with a brush attached to a second end of the flexible take up tube, and fixedly attached to the backsplash, adjacent to the second end of the flexible take up tube for directing a solvent spray; and an electric heater disposed in, and heating, a water based solvent in the container of water based solvent.

14. The parts washer of claim 13, further comprising a foot pedal switch coupled to the motor.

15. The parts washer of claim 13, in which the bladed fan is press fit to the first motor shaft end.

16. The parts washer of claim 13, in which the bladed fan is thermostatically controlled.

17. The parts washer of claim 13, in which the driveshaft and the support tube are of adjustable length.

* * * * *